(12) United States Patent
Danican

(10) Patent No.: US 12,398,314 B2
(45) Date of Patent: *Aug. 26, 2025

(54) FLOWBACK AID FOR FRACTURING FLUIDS

(71) Applicant: SCHLUMBERGER TECHNOLOGY CORPORATION, Sugar Land, TX (US)

(72) Inventor: Samuel Danican, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,412

(22) Filed: Nov. 6, 2023

(65) Prior Publication Data

US 2024/0084192 A1 Mar. 14, 2024

Related U.S. Application Data

(63) Continuation of application No. 15/552,454, filed as application No. PCT/US2016/018430 on Feb. 18, 2016, now Pat. No. 11,807,811.

(Continued)

(51) Int. Cl.
*C09K 8/68* (2006.01)
*C09K 8/60* (2006.01)
(Continued)

(52) U.S. Cl.
CPC .............. *C09K 8/68* (2013.01); *C09K 8/602* (2013.01); *C09K 8/604* (2013.01); *C09K 8/685* (2013.01);
(Continued)

(58) Field of Classification Search
CPC .......... C09K 8/602; C09K 8/604; C09K 8/62; C09K 8/68; C09K 8/685; C09K 8/86;
(Continued)

(56) References Cited

U.S. PATENT DOCUMENTS 7,632,787 B2    12/2009   Mirakyan
7,803,278 B2 *   9/2010   Talbot .................... C23F 11/10
                                                        162/DIG. 4

(Continued)

FOREIGN PATENT DOCUMENTS

JP    2003013092 A  *  1/2003
WO    2014108350 A1    7/2014

OTHER PUBLICATIONS

Translation of JP 2003013092 A (Year: 2003).*

(Continued)

*Primary Examiner* — Angela M DiTrani Leff
(74) *Attorney, Agent, or Firm* — Jeffrey D. Frantz

(57) ABSTRACT

Methods of fracturing a subterranean formation include introducing a fracturing fluid containing an aqueous medium, a viscosifying agent and a polyethylene oxide alkyl ether through a wellbore and into the subterranean formation, pressurizing the fracturing fluid to fracture the subterranean formation, and allowing the fracturing fluid to flow back into the wellbore from the subterranean formation. The polyethylene oxide alkyl ether useful in some embodiments is defined according to the formula:

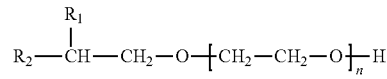

where $R_1$ and $R_2$ are independently selected from linear or branched alkyl groups having from 2 to 16 carbon atoms, and 'n' may be a value selected from within a range of from 1 to 100.

10 Claims, 1 Drawing Sheet

Related U.S. Application Data

(60) Provisional application No. 62/118,506, filed on Feb. 20, 2015.

(51) Int. Cl.
  *C09K 8/88* (2006.01)
  *E21B 43/267* (2006.01)
  *C09K 8/528* (2006.01)

(52) U.S. Cl.
  CPC .............. *C09K 8/88* (2013.01); *C09K 8/885* (2013.01); *C09K 8/887* (2013.01); *E21B 43/267* (2013.01); *C09K 8/528* (2013.01); *C09K 8/605* (2013.01); *C09K 2208/26* (2013.01); *C09K 2208/28* (2013.01); *C09K 2208/32* (2013.01)

(58) Field of Classification Search
  CPC .......... C09K 8/88; C09K 8/885; C09K 8/887; C09K 8/605; C09K 2208/26; C09K 2208/28; C09K 2208/32; E21B 43/267; E21B 43/26
  See application file for complete search history.

(56) References Cited

U.S. PATENT DOCUMENTS

| | | | |
|---|---|---|---|
| 11,807,811 B2* | 11/2023 | Danican | C09K 8/68 |
| 2006/0166836 A1 | 7/2006 | Pena | |
| 2009/0107681 A1 | 4/2009 | Hough | |
| 2009/0281004 A1* | 11/2009 | Ali | C09K 8/602 |
| | | | 507/263 |
| 2012/0067584 A1 | 3/2012 | Zhang | |
| 2012/0245060 A1 | 9/2012 | Jiang | |
| 2013/0180723 A1 | 7/2013 | Crick | |
| 2014/0332213 A1 | 11/2014 | Zhou | |
| 2015/0275627 A1 | 10/2015 | Xu | |

OTHER PUBLICATIONS

Kirk, et al., "Nuts", Encyclopedia of Chemical Technology, In Third Edition, vol. 16, 1981, pp. 248-273.

International Search Report and Written Opinion of PCT Application No. PCT/US2016/018430 dated May 31, 2016, 12 Pages.

* cited by examiner

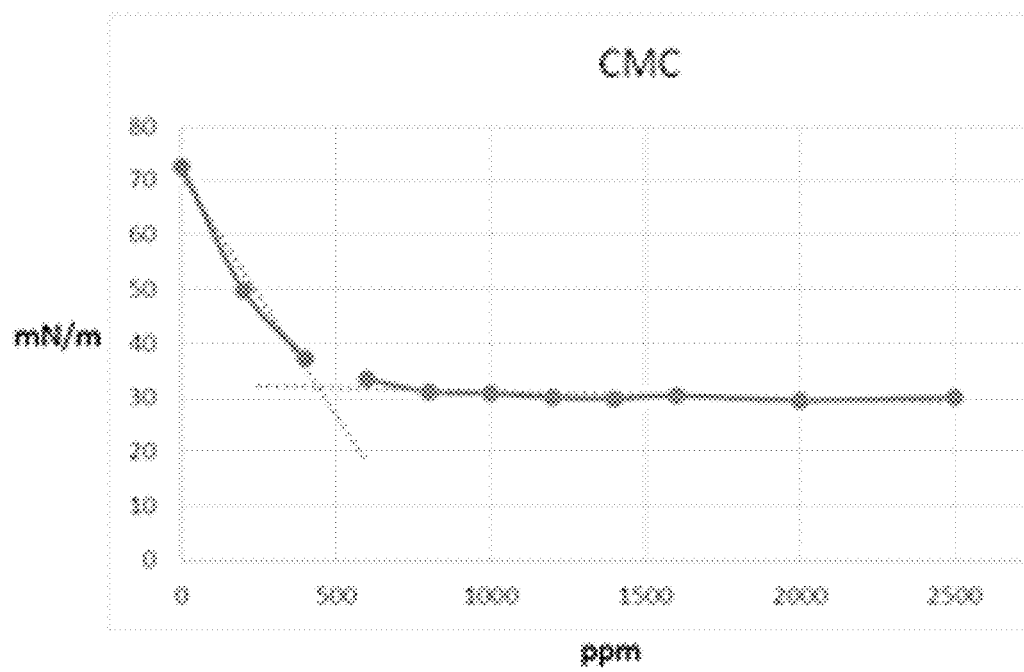

FLOWBACK AID FOR FRACTURING FLUIDS

RELATED APPLICATION INFORMATION

This application is a continuation of U.S. patent application Ser. No. 15/552,454, entitled "Flowback Aid for Fracturing Fluids", filed Aug. 21, 2017, now U.S. Pat. No. 11,807,811, which is a national stage entry under 35 U.S.C. § 371 of International Application No. PCT/US2016/018430, entitled "Flowback Aid for Fracturing Fluids", filed Feb. 18, 2016, which claims priority under 35 U.S.C. § 120 to U.S. Provisional Patent Application No. 62/118,506, filed Feb. 20, 2015, the disclosure of which is incorporated by reference herein in its entirety.

FIELD

The field to which the disclosure generally relates to is fracturing fluids that contain a flowback aid, and methods of fracturing a subterranean formation using fracturing fluids that contain a flowback aid.

BACKGROUND

This section provides background information to facilitate a better understanding of the various aspects of the disclosure. It should be understood that the statements in this section of this document are to be read in this light, and not as admissions of prior art.

Hydraulic fracturing is a process that forms fractures in a subterranean formation using a pressurized fluid. The fracturing fluid is introduced into the subterranean formation through a wellbore that has been drilled into the formation, and then pressurized to fracture the formation. Among other components, the fracturing fluid will typically contain a proppant material that enters into the newly formed fractures and prevents those fractures from closing after fracturing pressure is released.

At the end of a hydraulic fracturing job, a large surface-area fracture will have been created and propped permanently open by the application of a proppant-laden, pressurized, often aqueous, hydraulic fluid. The next step in the hydraulic fracturing job is to decrease the pressure applied to the aqueous hydraulic fluid to allow the fluid sitting in the near well-bore region of the target formation between the targeted hydrocarbons and the wellbore to flow back into the well and up to the surface for treatment and disposal or re-use later.

The amount of fracturing fluid left behind in the formation will diminish to an irreducible fraction and then stop flowing back. This irreducible fraction of fracturing fluid left behind in the formation can subsequently impede the flow of hydrocarbon from the petroliferous formation into the very high permeability proppant pack.

A flowback aid may be included in the fracturing fluid to reduce capillary pressure and water blocks, thereby improving the kinetics of the flowback and preventing or minimizing the leaving-behind of any substantial amount of the fracturing fluid. Flowback aids, such as surfactants, have also been shown to aid in the "clean-up" of the proppant pack, thereby accelerating the flow of hydrocarbons through the high permeability proppant pack, as well. Known flowback aids each have their own set of properties and may present a tradeoff of one beneficial property for another undesirable property. Determining the best flowback aid for a specific reservoir may involve multiple considerations.

Experience has demonstrated that a scientific measure of the ability of a flowback aid to change the wettability of the near wellbore formation or to reduce the water saturation in the pores of the targeted subterranean petroliferous formation can be obtained by accurately measuring the contact angle formed by the flowback aid within a capillary tube. In flowback tests on cores simulating the performance of an element of the reservoir under simulated in-situ conditions, experience has shown that capillary contact angles greater than 80° are correlated with the more efficient flowback of aqueous fluids (simulating those used in formation fracturing). Reducing the water saturation in the pores of the targeted subterranean petroliferous formation is desirable for increased production of oil or gas because the volume of the flow channel for oil or gas through the pores in the rock will be occupied, in part, by the immiscible water phase; and reducing the fraction of this volume that is occupied by water will necessarily increase the fraction of this volume that is available for flow by oil or gas.

There exists an ongoing need to develop flowback solutions which provide substantial flowback of fracturing fluids, such need, met at least in part, by the following disclosure.

SUMMARY

This section provides a general summary of the disclosure, and is not a necessarily a comprehensive disclosure of its full scope or all of its features.

Some embodiments according to the disclosure are aqueous fracturing fluids which contain a polyethylene oxide alkyl ether according to the formula:

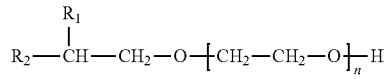

where $R_1$ and $R_2$ are independently selected from linear or branched alkyl groups having from 2 to 16 carbon atoms, and wherein 'n' may be a value from within a range of from 1 to 100. The fluids further contain an aqueous medium, and a viscosifying agent. In some cases, the concentration of the polyethylene oxide alkyl ether in the fracturing fluid is between about 0.01 to about 0.5 percent by weight between about 0.1 and about 0.3 percent by weight, or even between about 0.15 and about 0.25 percent by weight. In some aspects, the polyethylene oxide alkyl ether is polyethylene oxide 2-ethylhexyl ether. The fracturing fluid may, in some instances, have a contact angle of greater than or equal to about 80 degrees, and the surface tension may be less than about 35 mN/m. The fluid may also include a proppant, in some cases.

In some other embodiments of the disclosure, methods of fracturing a subterranean formation include introducing a fracturing fluid containing an aqueous medium, a viscosifying agent and a polyethylene oxide alkyl ether through a wellbore and into the subterranean formation, pressurizing the fracturing fluid to fracture the subterranean formation, and allowing the fracturing fluid to flow back into the wellbore from the subterranean formation. The polyethylene oxide alkyl ether is defined according to the formula:

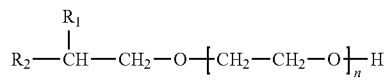

where $R_1$ and $R_2$ are independently selected from linear or branched alkyl groups having from 2 to 16 carbon atoms, and 'n' may be a value selected from within a range of from 1 to 100. The concentration of the polyethylene oxide alkyl ether in the fracturing fluid may be between about 0.01 to about 0.5 percent by weight between about 0.1 and about 0.3 percent by weight, or even between about 0.15 and about 0.25 percent by weight. In some aspects, the polyethylene oxide alkyl ether is polyethylene oxide 2-ethylhexyl ether.

In other embodiments according to the disclosure, methods include introducing a fracturing fluid through a wellbore into the subterranean formation, wherein the fracturing fluid a polyethylene oxide 2-ethylhexyl ether according to the formula:

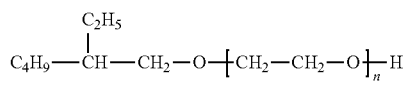

where 'n' may be a value from within a range of from 1 to 50, and the fracturing fluid has a contact angle of greater than or equal to 80 degrees and a surface tension less than about 35 mN/m. The fracturing fluid pressurized to fracture the subterranean formation, and thereafter, the fracturing fluid is allowed to flow back into the wellbore from the subterranean formation. The concentration of the polyethylene oxide 2-ethylhexyl ether in the fracturing fluid may be between about 0.01 to about 0.5 percent by weight, or even between about 0.1 to about 0.3 percent by weight. In some aspects, the fracturing fluid further includes a proppant.

BRIEF DESCRIPTION OF THE DRAWINGS

Certain embodiments of the disclosure will hereafter be described with reference to the accompanying drawings, herein like reference numerals denote like elements. It should be understood, however, that the accompanying FIGURE illustrates one or more implementations described herein and are not meant to limit the scope of various technologies described herein, and FIGURE shows data and a plotted curve indicating a critical micelle concentration of a polyethylene oxide alkyl ether ionic surfactant used in fracturing fluids in accordance with the disclosure.

DETAILED DESCRIPTION

At the outset, it should be noted that in the development of any actual embodiments, numerous implementation-specific decisions must be made to achieve the developer's specific goals, such as compliance with system and business related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating some embodiments and should not be construed as a limitation to the scope and applicability. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range disclosed and enabled the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "formation" as utilized herein should be understood broadly. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "fluid" as utilized herein should be understood broadly. In certain embodiments, a fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, viscosified fracturing fluid, a near wellbore damage cleanup fluid, a surfactant treatment fluid, an unviscosified fracture fluid (e.g. slick water fracture fluid), and/or any other fluid consistent with the fluids otherwise described herein. A fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), mineral acids, organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate, for example at least 0.5 barrels per minute (bpm), although the specific example is not limiting. A high pressure pump includes a pump capable of pumping fluids at an oilfield relevant pressure, including at least 500 psi, at least 1,000 psi, at least 2,000 psi, at least 5,000 psi, at least 10,000 psi, up to 15,000 psi, and/or at even greater pressures. Pumps suitable for oilfield cementing, matrix acidizing, and/or hydraulic fracturing treatments are available as high pressure pumps, although other pumps may be utilized.

Some embodiments according to the disclosure are methods of fracturing a subterranean formation with aqueous fracturing fluid containing a polyethylene oxide alkyl ether nonionic surfactant flowback aid to reduce capillary pressure and/or water block, as well as providing substantial flowback of the fracturing fluids after the fractures are formed. Some useful polyethylene oxide alkyl ethers are of the formula:

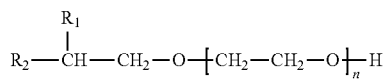

where $R_1$ and $R_2$ are independently selected from linear or branched alkyl groups having from 2 to 16 carbon atoms. Another embodiment of the disclosure provides an additive to a fracturing fluid, wherein the additive includes polyethylene oxide alkyl ether of the above formula. "n" may be any suitable integer, or decimal value within a range of integers, required to achieve properties according the disclosure, such as, but not limited to, an integer from 1 to 100. In some embodiments $R_1$ is an ethyl group and $R_2$ is a n-butyl group, and the polyethylene oxide alkyl ether is polyethylene oxide 2-ethylhexyl ether, according to the formula:

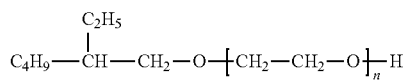

where n may be an integer from 1 to 50. In some embodiments, the polyethylene oxide 2-ethylhexyl ether is described by Chemical Abstracts Service (CAS) #26468-86-0.

The concentration of the polyethylene oxide alkyl ether in the aqueous fracturing fluid may vary according to the requirements of a particular fracturing job. In some cases, the polyethylene oxide alkyl ether is present in a concentration that is effective to improve the flowback of the fracturing fluid. In some embodiments, a 10% by weight aqueous solution of polyethylene oxide alkyl ether is added to the fracturing fluid in a concentration between about 0.1 to about 5 gallons per thousand gallons of fracturing fluid (gpt), between about 1 to about 3 gpt, or even between about 1.5 to about 2.5 gpt. Notwithstanding the exemplary values and ranges disclosed above, it is within the scope of the disclosure that the polyethylene oxide alkyl ether is included in the aqueous fracturing fluid at a concentration effective to improve the flowback of the fracturing fluid. In an alternative, the combination of alcohol ethoxylated and amine oxide should be effective to cause the aqueous fracturing fluid to have a contact angle of greater than or equal to 80 degrees, and a surface tension less than about 35 mN/m.

In some embodiments of the disclosure, the compositions (and methods of use thereof) contain a viscosifier in an amount to impart suitable viscosity properties into the fluid, as described above. Any suitable viscosifier readily known to those of skill in the art for its ability to generate adequate viscosity properties for the treatment operation may be used. Such viscosifiers include, but are not necessarily limited to, surfactants, such as viscoelastic surfactants, a polysaccharide or chemically modified polysaccharide, polymers such as cellulose, derivatized cellulose, guar gum, derivatized guar gum, xanthan gum, or synthetic polymers such as polyacrylamides and polyacrylamide copolymers. Useful are ionically modified polysaccharides which are regularly substituted, such as those described in U.S. Pat. No. 7,632,787, incorporated herein by reference thereto. The viscosifier may be incorporated in an amount suitable to provide measured fluid viscosity from about 20 mPa-s to about 400 mPa-s at a shear rate of 100 s-1 over a temperature range from about 80° F. to about 300° F., or from about 40 mPa-s to about 400 mPa-s at a shear rate of 100 s-1 over a temperature range from about 80° F. to about 300° F. Fluids may further contain various additives well known in stimulation treatments (such as, for example, corrosion inhibitors, iron control agents, surfactants, clay control additives, buffers, scale inhibitors and the like) provided that the additives do not interfere with the desired action or stability of the fluid.

A fiber component may be included in fluids useful in accordance with the disclosure to achieve a variety of properties including improving particle suspension, and particle transport capabilities, and gas phase stability. Fibers used may be hydrophilic or hydrophobic in nature. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used, the fiber component may be included at concentrations from about 1 to about 15 grams per liter of the liquid phase of the fluid, from about 2 to about 12 grams per liter of liquid, or even from about 2 to about 10 grams per liter of liquid.

The aqueous fracturing fluid may include additional components that are known to those skilled in the art. For example, the aqueous fracturing fluid may include a proppant. Furthermore, the aqueous fracturing fluid may include one or more additive selected from an acid, a friction reducing agent, a viscosifying agent activator or crosslinker, a biocide, a clay stabilizer, an anti-foaming agent, a pH adjuster, a corrosion inhibitor, a fluid-loss additive, an iron control agent, a scale inhibitor or scale control agent, a chelating agent, a viscosifying-agent breaker, and combinations thereof.

Another embodiment of the disclosure provides methods of fracturing a subterranean formation. The methods include introducing a fracturing fluid through a wellbore into the subterranean formation, where the fracturing fluid comprises an polyethylene oxide alkyl ether according to the formula above, pressurizing the fracturing fluid to fracture the subterranean formation placing proppant particles therein, and allowing the fracturing fluid to flow back into the wellbore from the subterranean formation. It should be recognized that further embodiments of the methods may include, for example, the use of a fracturing fluid in accordance with any of the fracturing fluid embodiments described herein.

As discussed above, embodiments may also include placing proppant particles in a fracture. The proppant particles may be substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particle formation, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981.

The concentration of proppant in the fluid can be any concentration known in the art, and will in some cases, be in the range of from about 0.05 to about 3 kilograms of proppant added per liter of liquid phase. Also, any of the proppant particles can further be coated with a resin to potentially improve the strength, clustering ability, and flow back properties of the proppant.

In addition to use in aqueous fluid as described above, the polyethylene oxide alkyl ethers may be used in any other oilfield fluid where specific surface tension and contact angles are targeted. Such fluids may be useful in subterranean formation operations such as fracturing, matrix acidizing, wellbore cleanup, pickling, near wellbore damage cleanup, drilling, surfactant treatments, and the like.

EXAMPLE

In an example, a 10.5% by weight mixture of polyethylene oxide 2-ethylhexyl ether nonionic surfactant in an aqueous medium was evaluated as a flow back aid. Properties of the mixture were specific gravity @ 20 deg C. of 0.987-1.017, pH of about 6.2, and surface tension contact angle minimum of 80 degrees, as determined by capillary tube method.

The mixture was added to de-ionized water at a concentration of 2 gallons per thousand (gpt), and evaluated for surface tension properties according to the following procedure:
1. Turn on the surface tensiometer according to equipment start up procedure;
2. Start equipment software if available;
3. Ensure glass vessel for measurements are cleaned with alcohol and DI water and vessels are dry;
4. Fill the sample vessel with the appropriate volume of sample solution to be tested, and take care to avoid any foaming or bubbles;
5. Place the vessel in the thermostat vessel holder and let the solution equilibrate over the target rest period;
6. Rinse the Wilhelmy plate with acetone and DI water on both sides;
7. Pass the plate carefully over open flame, turning the plate over on each pass, until the plate first emits light that is bright orange and then finally white;
8. Place the platinum plate in the plate suspension clamp;
9. Unlock the clamp and set it to zero or a constant value;
10. Move the vessel into start position;
11. Start the testing according to specific equipment procedure and collect data for 10 min;
12. Record the data point;
13. Repeat measurement 3 times by repeating steps 1 through 12.

The surface tension value with no resting period was 36.92 mN/m, after a 30-min resting period, 34.09 mN/m, and after a 4-hr resting period, 33.21 mN/m.

The critical micelle concentration (CMC) was determined with the tensiometer by measuring the surface tension of a series of polyethylene oxide 2-ethylhexyl ether nonionic surfactant concentrations in the aqueous medium, according to the test procedure described above. To determine the CMC from experimental data, the intersection of two straight lines traced through plots of the measured property versus the surfactant concentration is determined and set as the CMC. FIGURE shows the data and plotted curve indicating a CMC of 440 ppm. The concentration of the polyethylene oxide 2-ethylhexyl ether nonionic surfactant in the treatment fluid was then adjusted to the CMC of 440 ppm.

Contact angle measurements were then conducted on the treatment fluid according to the following procedure:
1. Prepare the surfactant solution in a 150 mL glass beaker, and ensure the solution is thoroughly mixed to achieve homogeneity;
2. Place 100 mL of DI water in a second 150 mL beaker;
3. Carefully lower a capillary tube perpendicular to the surface of the surfactant solution until the end of the tube just touches the surface of the solution;

4. Allow the surfactant solution to be drawn up into the capillary tube, then remove from the surface and hold for 30 seconds;
5. Evacuate the solution from the capillary tube by holding a paper towel to the end of the tube containing the solution, and ensure that there is no fluid left in the tube;
6. Take the freshly evacuated capillary tube and carefully lower the tube perpendicular to the surface of the DI water until the end of the tube just touches the surface of the solution;
7. Allow the DI water to be drawn up into the capillary tube, and hold in place for 10 seconds;
8. Pull the capillary tube from the solution and measure the height of the DI water in the tube to the nearest 0.10 of a division with a caliper;
9. Repeat Steps 2-8 for a total of 3 times using the same capillary tube.

The contact angle, $\theta$, for the surfactant solution was determined by the following equation;

$$\rho \cdot g \cdot h = pc = (2 \cdot \gamma \cdot \cos \theta)/r \text{-or-} \theta = \mathrm{acos}[(\rho \cdot g \cdot h \cdot r)/(2 \cdot \gamma)]$$

where:
$\rho$=density of water, 997 kg/m$^3$
g=acceleration due to gravity=9.81 m/s$^2$
h=hydrostatic height [m]
pc=capillary pressure [Pa]
$\gamma$=surface tension [N/m] (surface tension of DI water is 72.2 mN/m=72.2·10-3 N/m)
$\theta$=contact angle [deg]
r=capillary radius [m]

The values measured for the polyethylene oxide 2-ethylhexyl ether nonionic surfactant containing treatment fluid were $\theta_1$=88.7 degrees, $\theta_2$=83.6 degrees, and $\theta_3$84.6 degrees, which indicated the treatment fluid exceeded the target specification of great than 80 degrees.

Contact angle persistency tests were then conducted where the treatment fluid samples were introduced into separate capillary tubes. The hydrostatic height with de-ionized water was measured, but then instead of discarding the tube, the solution was evacuated with a paper towel and the hydrostatic height was measured again with deionized water. The last 2 steps were repeated a few times. The values for the treatment fluids were $\theta_1$a=84.6 degrees, $\theta_1$b=86.4 degrees, $\theta_1$c=86.5 degrees, $\theta_1$d=86.5 degrees and $\theta_1$e=86.6 degrees.

Fluid recovery evaluations were then conducted. For the fluid recovery tests, the procedure included:
placing 325-mesh screen is placed at the bottom of a 60-mL syringe
clamping the syringe and filling with about 16 mL of treatment fluid (which contained 2% KCl+2 gpt surfactant in de-ionized water)
slowly adding 50 g of 70-140 US mesh sand into the syringe and removing excess fluid from the top using a pipette
determining the amount of liquid filling the void space in the pack (pore volume) using mass-by-difference ($m_{initial}$)
adding additional test fluid to the syringe up to the 60-mL mark
releasing the clamp and allowing 3 pore volumes of the test fluid to flow through the pack
reapplying the clamp, and removing excess test fluid from the top after the 3 pore volumes are collected
adding Escaid Pathfrac mineral oil to the column up to the 60-mL mark (this level of oil is maintained throughout the testing by adding additional oil as necessary)
releasing the clamp and starting a timer simultaneously
allowing the test fluid to flow through the pack and collecting the fluid in a beaker
reapplying the clamp and recording the time when the first drop of oil is detected in the beaker Amounts of the aqueous fluid recovered as a function of time for the fluid containing the polyethylene oxide 2-ethylhexyl ether nonionic surfactant indicated that the recovery performance was acceptable in behavior. The following expression was used in the comparisons for fluid recovery (FR) at time (t):

$$FR(t) = m_{aq}(t)/m_{initial}*100$$

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, preparation and operation of compositions and methods to achieve that described in the disclosure, variations in design, formulation, and condition may present, for example.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:
1. A method of treating a subterranean formation, comprising:
forming a treatment fluid comprising:
a polyethylene oxide 2-ethylhexyl ether according to a formula:

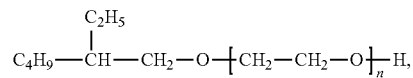

wherein 'n' is a value from within a range of from 1 to 100;
an aqueous medium; and
a viscosifying agent, present in an amount suitable to provide a fluid viscosity of the treatment fluid between about 20 mPa·s and about 400 mPa·s at a shear rate of 100 s$^{-1}$, over a temperature range between about 80° F. and about 300° F.; and placing the treatment fluid in the subterranean formation.

2. The method of claim 1, wherein a concentration of the polyethylene oxide 2-ethylhexyl ether in the treatment fluid is between about 0.01 to about 0.5 percent by weight.

3. The method of claim 1, wherein a concentration of the polyethylene oxide 2-ethylhexyl ether in the treatment fluid is between about 0.1 to about 0.3 percent by weight.

4. The method of claim 1, wherein a concentration of the polyethylene oxide 2-ethylhexyl ether in the treatment fluid is between about 0.15 and about 0.25 percent by weight.

5. The method of claim 1, wherein the treatment fluid further comprises a proppant.

6. The method of claim 5, wherein the proppant has a concentration from about 0.05 kilograms to about 3 kilograms per liter of liquid phase of the aqueous medium.

7. The method of claim 1, wherein the treatment fluid has a contact angle of greater than or equal to 80 degrees.

8. The method of claim 1, wherein the treatment fluid has a surface tension less than about 35 mN/m.

9. The method of claim 1, wherein the treatment fluid further comprises an additive selected from an acid, a friction reducing agent, a viscosifying agent activator or crosslinker, a biocide, a clay stabilizer, an anti-foaming agent, a pH adjuster, a corrosion inhibitor, a fluid-loss additive, an iron control agent, a scale inhibitor or scale control agent, a chelating agent, a breaker, and combinations thereof.

10. The method of claim 1, wherein placing the treatment fluid in the subterranean formation comprises a fracturing operation, a matrix acidizing operation, a wellbore cleanup operation, a pickling operation, a near wellbore damage cleanup operation, a drilling operation, or a surfactant treatment operation, or a combination thereof.

* * * * *